United States Patent [19]

Volta

[11] Patent Number: 4,746,913

[45] Date of Patent: May 24, 1988

[54] DATA ENTRY METHOD AND APPARATUS FOR THE DISABLED

[76] Inventor: Arthur C. Volta, 1422 Arnold Ave., Roslyn, Pa. 19001

[21] Appl. No.: 872,269

[22] Filed: Jun. 9, 1986

Related U.S. Application Data

[63] Continuation-in-part of Ser. No. 602,969, Apr. 23, 1984, abandoned.

[51] Int. Cl.⁴ .............................................. G09G 3/02
[52] U.S. Cl. ................................ 340/706; 340/365 S; 340/825.19; 340/407; 400/87
[58] Field of Search .................. 340/407, 365 R, 706, 340/709, 825.19, 365 S; 400/87

[56] References Cited

U.S. PATENT DOCUMENTS

| | | | |
|---|---|---|---|
| 4,250,637 | 2/1981 | Scott | 340/407 |
| 4,408,192 | 10/1983 | Ward et al. | 340/825.19 |
| 4,558,315 | 12/1985 | Weiss et al. | 340/825.19 |
| 4,567,479 | 1/1986 | Boyd | 340/825.19 |
| 4,642,610 | 2/1987 | Smith, III | 340/365 R |

FOREIGN PATENT DOCUMENTS 2128786  5/1984  United Kingdom .................. 400/87

OTHER PUBLICATIONS

"Manipulating Device for the Disabled"; Pol. Tech. Rev. (Poland, vol. 135, No. 1, 1981.
"Comm. Aid for Nonvocal Handicapped People", E. Shwedyk, J. Gordon, Med & Bio Eng. & Comp. (Mar. 77).

Primary Examiner—John W. Caldwell, Sr.
Assistant Examiner—Tyrone Queen

[57] ABSTRACT

A method and apparatus allows a user to scan through a predetermined character set through the implementation of a continuously variable volitional signal, and for selecting a specific character. The scanning rate is proportional to the user controlled volitional signal.

20 Claims, 5 Drawing Sheets

DATA ENTRY METHOD AND APPARATUS FOR THE DISABLED

This application is a continuation-in-part of my co-pending application Ser. No. 602,969, filed Apr. 23, 1984 now abandoned.

The data entry method and apparatus enables the generation of character or command codes for storage, display or control relating to a computer, video display terminal, printer, typewriter, or other device or system whereupon such defice codes are used. The said device or process allows the human operator to generate the said codes without the necessary use of the hands or fingers. Character codes are generated by the user as he generates a continuously variable or step variable electronic signal via a pressure transducer actuated by the mouth in conjunction with a visual display. In an alternate embodiment, any physical means of generating a continuously varying signal (including myoelectric responses) is used in conjunction with the said visual display.

The present invention relates to data input devices and more particularly data input devices used by those people who are physically handicapped in the use of their arms and fingers.

The conventional means of data entry used by the said handicappped user is by means of special keyboards, mouth sticks, head pointers, and character scanners. Special keyboards, such as those equipped with unusually large key switches or protective masks surrounding the key switches depend upon the limited usage of the arm or ringer muscles and cannot be used by those who are totally paralyzed in these areas. Mouth stick and head pointers which are designed to either close key switches or to direct a beam of light to electronic sensors are relatively slow and are not suitable to be used by those who are disabled with head and neck impairments. Character scanners which have been developed prior to this invention are slow and awkward to use.

Previously existing designs operate as follows. Characters visible on a display panel are sequentially accentuated typically by means of illumination by miniature lights. (This process of sequentially accentuating the display characters is heretofor referred to as "scanning".) When the user selects a character, he waits until that character is accentuated. At the precise moment that the selected character is accentuated the user effects a switch closure by means of a pressure sensitive switch, or switch actuated from the eyebrow. Characters are located on the display in the form of a matrix. The user selects the character column by means of a switch closure. A second switch closure is necessary to select a specific character from the selected column. Scanning speed is selected by means of switch closures. Once the scanning speed is selected, the selected speed remains in effect until a new speed is selected via the prescribed switch closures. The said previously existing scanning technique is inherently deficient in the following respects: (1) Scanning speeds sufficiently slow to enable the user to close the said switch at the necessary precise moment is only necessary when the characters in the immediate vicinity of the one to be selected are being sequentially accentuated. Characters accentuated sufficiently previous to switch closure such as not to affect the accuracy of the said switch closure are scanned needlessly slow, wasting time and decreasing throughput. (2) Scanning speeds may be selected which physically or metally exceed the capability of the user, thus the user may be unable to accurately select characters and consequently unable to re-select a slower, more suitable, scanning speed.

This invention overcomes the disadvantages of previously existing display scanning data input devices specifically by employing a means of dynamically altering the rate at which the displayed characters are scanned. Characters which are not in the immediate proximity of the character to be selected may be quickly scanned. The scanning may be slowed in the immediate vicinity of the character to be selected or stopped at the said selected character before the selection is made. Character selection is thereby rapid and accurate.

The principle object of this invention is to provide a data entry device which may be rapidly and accurately controlled by means of air pressures generated from the users mouth, pressures generated from any part of the users anatomy, continuously variable movements generated from any part of the user's anatomy, sounds varying in frequency or magnitude, myoelectric responses, or any other means by which the user may generate continuously variable physical or electrical phenomena which can be transduced to a continuously variable or step variable electrical signal. The said user generated phenomena enables the user to control the rate at which characters are displayed or accentuated sequentially to the user for entry selection. The said user generated phenomena also enables the user to control the entry of said characters or commands into a computer, video terminal, printer, typewriter, or other device which may be used or controlled by character codes.

Another object of this invention in an alternate embodiment is to provide a visual display which enhances the speed and accuracy of the said means of character code generation.

Other objects and advantages of the invention will become better understood hereinafter from the consideration of the specification with reference to the accompanying drawings forming part thereof, and in which like numerals correspond to like parts in each reference thereto.

BACKGROUND OF THE INVENTION

The instant invention relates to data input devices used by people who are physically handicapped in the use of their arms and fingers. The conventional means of data entry devices used by individuals who are physically handicapped in the use of their arms and fingers is to employ special keyboards, mouth sticks or head pointers. Special keyboards, such as those equipped with unusually large key switches or protective masks surrounding the key switches, depend upon the limited usage of an arm or finger muscles and most oftentimes cannot be successfully used by those who are totally paralyzed in those areas. Mouth sticks and head pointers which are designed to either close key switches or to direct a beam of light to electronic sensors are relatively slow and are not suitable to be used by those who are disabled with head and neck impairments.

In prior art devices, characters visible on a display panel are sequentially accentuated by means of illumination of miniature lights. (The process of sequentially accentuating the display characters is referred to herein as "scanning"). When a user selects a character, he waits until that character is accentuated, or highlighted, and at the precise moment that the selected character is accentuated, the user effects a switch closure by means of a pressure sensitive switch or other similar device. If the user wishes to "scan" the characters on the visible display board in front of him, he typically is able to select, from one or two constant speeds, a scanning speed by means of switch closures. However, once the scanning speed is selected, that speed remains in effect until a new scanning speed is selected via a different combination of switch closures. The above-mentioned prior art devices therefore have deficiencies in controlling the actual input of selected characters and in varying the speed by which characters are scanned.

SUMMARY OF THE INVENTION

Referring to the drawing in FIG. 1, the improved data input device comprising the present invention includes a user manipulated transducer 10 which issues forth a continuously varying or step varying signal to a visual display controller 300 by means of electrical signal, radio communication, sonics, or optics. The level of intensity transduced from the said continuously varying or step varying signal controls the rate at which the display 26 sequentially accentuates displayed characters heretofor referred to as character scanning. Characters may be accentuated by means of illumination, back-lighting, reverse video, or underscoring. The individual character 28 is instantaneously distinguished from the other characters on the display. Specific levels of intensity of the transduced signal accomplish other control related functions such as character entry or display modification and control. Character entry is accomplished when the user manipulates the transducer such that the level of intensity of the said transduced signal attains the said specific level whereupon character entry is attained, at which time the code corresponding to the character being accentuated on the display is communicated therefrom to the storage device, computer, display, video display terminal, printer, typewriter, or other device or system whereupon such codes may be used.

The instant invention senses negative and positive pressures, and the magnitude thereof and transmits a signal at an equivalent voltage level. A voltage controlled oscillator and a first comparator receive increases in the voltage level and a second comparator receives decreases in the voltage level. Increases within a pre-determined range cause a first counter and a second counter to produce coordinated signals, which are input to a Read Only Memory (ROM) chip and a character display device to allow sequential selection from a given set of characters. A selected character is simultaneously displayed and sent to a transmitter. A second comparator receives the decreased voltage level and causes the transmitter to send the selected character to a preselected output device.

OBJECTS OF THE INVENTION

It is therefore an object of the present invention to provide a data input device that can be used by an individual having a physical handicap.

It is a further object of the present invention to provide a data input device that can be activated at a variable rate by a handicapped user.

It is another object of the present invention to provide a data input device that provides precise control in selecting appropriate characters by use of either positive or negative variable pressures.

These and other objects and many attendant advantages of the present invention will be readily appreciated as the same become better understood by reference to the following detailed description when considered in connection with the accompanying drawings.

DESCRIPTION OF THE PREFERRED EMBODIMENT

Figure 1:
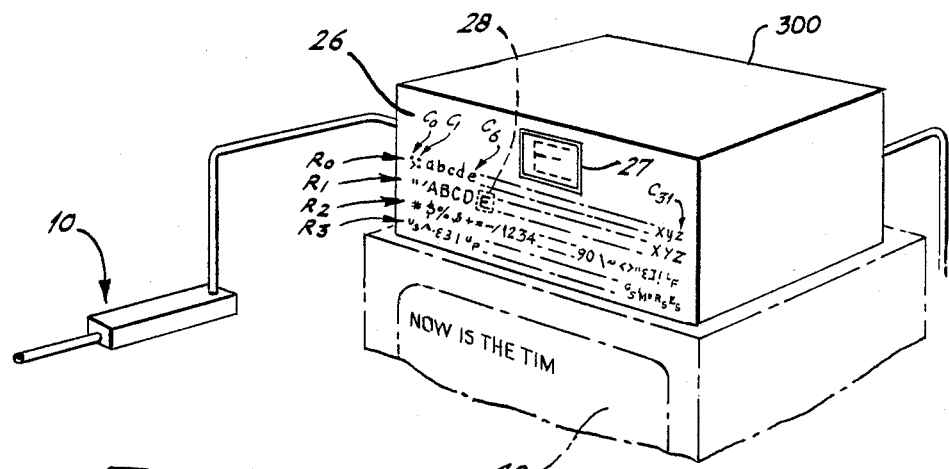
FIG. 1 is a perspective view of the instant invention as connected to a peripheral device (shown in phantom)

The instant invention, as seen in FIG. 1 and when connected to a conventional AC outlet or other power source (not shown), allows a user to scan through, or visually perceive at a user variable speed, various characters presented on both a visual display 26 and miniature display 27 and control selection and transmission of a particular character by use of input device 10. Multivibrator 92 (FIG. 5) emits one pulse 50 when the power to the invention is turned on. Pulse 50 accomplishes initialization and prevents spurious character transmission. That selected character is then sent to an output device, such as a computer for use in a pre-arranged program (as shown in phantom at 40) or a printer or a typewriter. The electronic circuit used for this device is represented in the block diagram of FIG. 2 where device 10 is comprised of a sensor 11 which detects either positive or negative pressures developed in the user's mouth and an amplifier 12. If the user allows sensor 11 to rest, the pressure is at atmospheric pressure and the output of sensor amplifier 12 assumes a quiescent, or neutral level. As a vacuum or negative pressure is applied to sensor 11, the voltage level from amplifier 12 increases. As positive pressure is applied to sensor 11, the voltage level from amplifier 12 decreases. Negative or positive pressure is achieved when the user inhales or sips in (as on a drinking straw), or exhales or puffs out, respectively, on device 10. Amplifier 12 amplifies the signals coming from sensor 11 such that voltage is a positive value and proportional to the applied vacuum. Likewise, applied pressure causes the output voltage to assume a negative value proportional to the applied pressure.

As the user changes vacuum on sensor 11, he visually perceives a background light (from a Light Emitting Diode (LED) array) changing (in a manner to be explained) behind the various characters (or "scanning") on display 26 and different characters appearing on miniature display 27. Display 26 is a transparent board with the desired characters pasted on its front surface at predetermined locations. By halting the application of vacuum, the user brings the scanning process to a halt, thereby backlighting one character continuously, such as at the letter "E", 28, as is shown. Simultaneously, whenever the background light illuminates a character, a larger representation of that character is shown above the top row, at miniature display 27, by a process to be described.

Sensor 11 can be any of the commercially available pressure sensors. Sensor 11 responds to pressure inputs above and below atmospheric pressure by transducing these negative and positive pressures to proportional positive and negative voltages, respectively.

For purposes of illustration, and not as a limitation, the rows of characters on screen 26 will be referred to from the top row down as $R_0$, $R_1$, $R_2$ and $R_3$. In a similar fashion, the columns of characters on screen 26 will be referred to from left to right at $C_0$, $C_1$, $C_2$, ... $C_{30}$, $C_{31}$. Whenever a set of characters is pasted on board 26, they are aligned to correspond with those spaces. In this manner, the position of a specific character may be designated as, for example, $C_6$, $R_1$, i.e. the space behind the character "E".

As seen in FIG. 1, in row $R_1$ the "E" is indicated by backlighting (as shown in the Figure as a ring of dots around the "E") and the representation of the letter "E" is simultaneously displayed on miniature display 27. The user can scan by sequentially illuminating characters from left to right (as will be explained). When the user reaches the last character on a row, which in the case of row $R_1$ is a "Z", the scanning will "wrap" around and start at the first character on that row, the "quotations", and proceed forth so that $R_1$, $C_0$ is lit, then $R_1$, $C_2$ is lit, then $R_1$, $C_3$ is lit, and so forth on to $R_1$, $C_{31}$. After $R_1$, $C_{31}$ is lit, the next light to be lit is $R_1$, $C_0$. The user initiates scanning by inhaling, drawing, sipping, or otherwise creating negative pressures on sensor 11.

Sensor 11 detects positive and negative pressures. In another embodiment, sensor 11 may detect motion or it may detect the frequency of a whistle, or it may detect a biofeedback amplifier. As the user develops the negative pressure on the sensor, voltage 13 increases from the output of amplifier 12. Sensor 11 and amplifier 12 form a signalgenerating device that sends a proportional, or analogue, signal.

Figure 2:
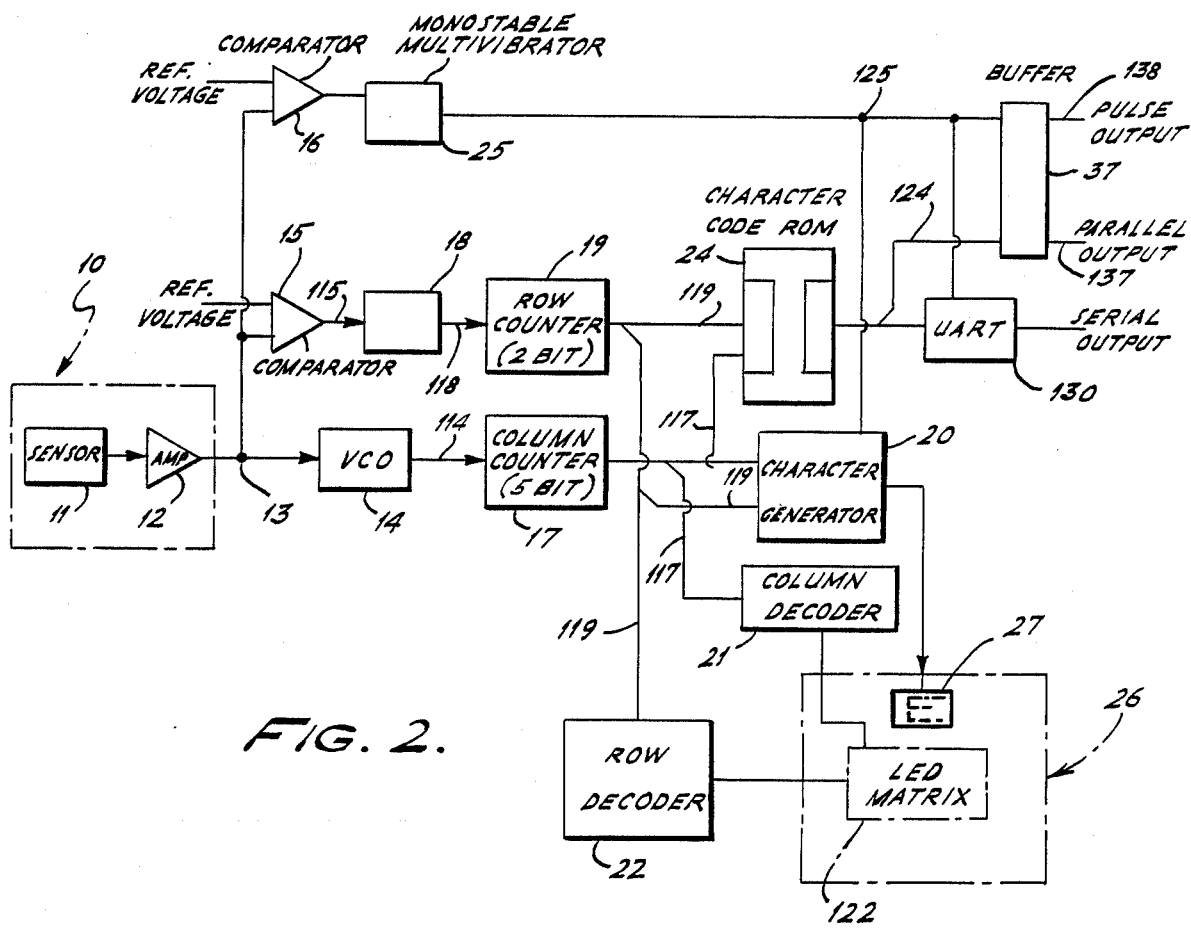
FIG. 2 is a block diagram of the instant invention.
Figure 3:
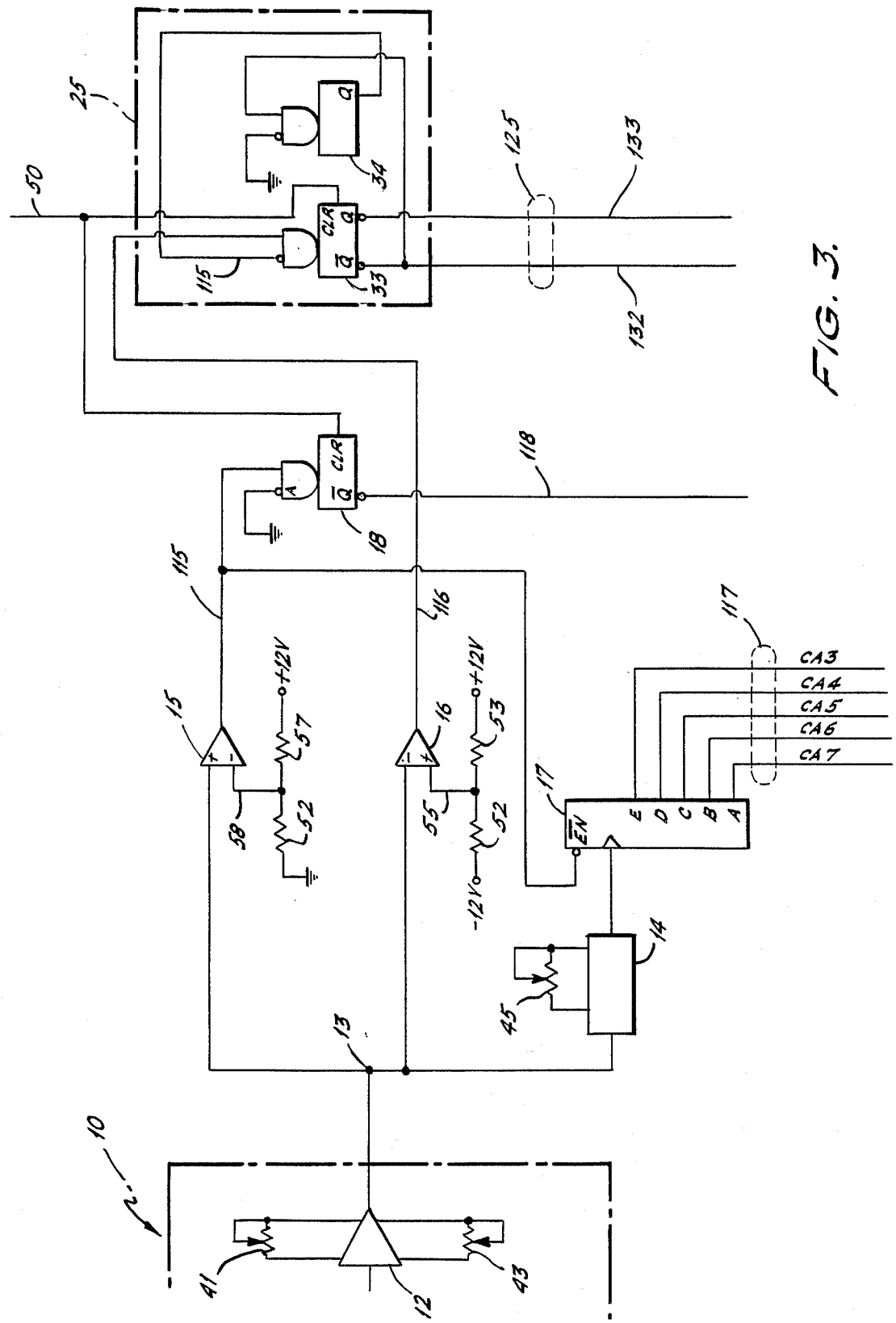
FIG. 3 is a fragmentary schematic diagram of the instant invention showing elements 10 and 14 of FIG. 2.
Figure 4:
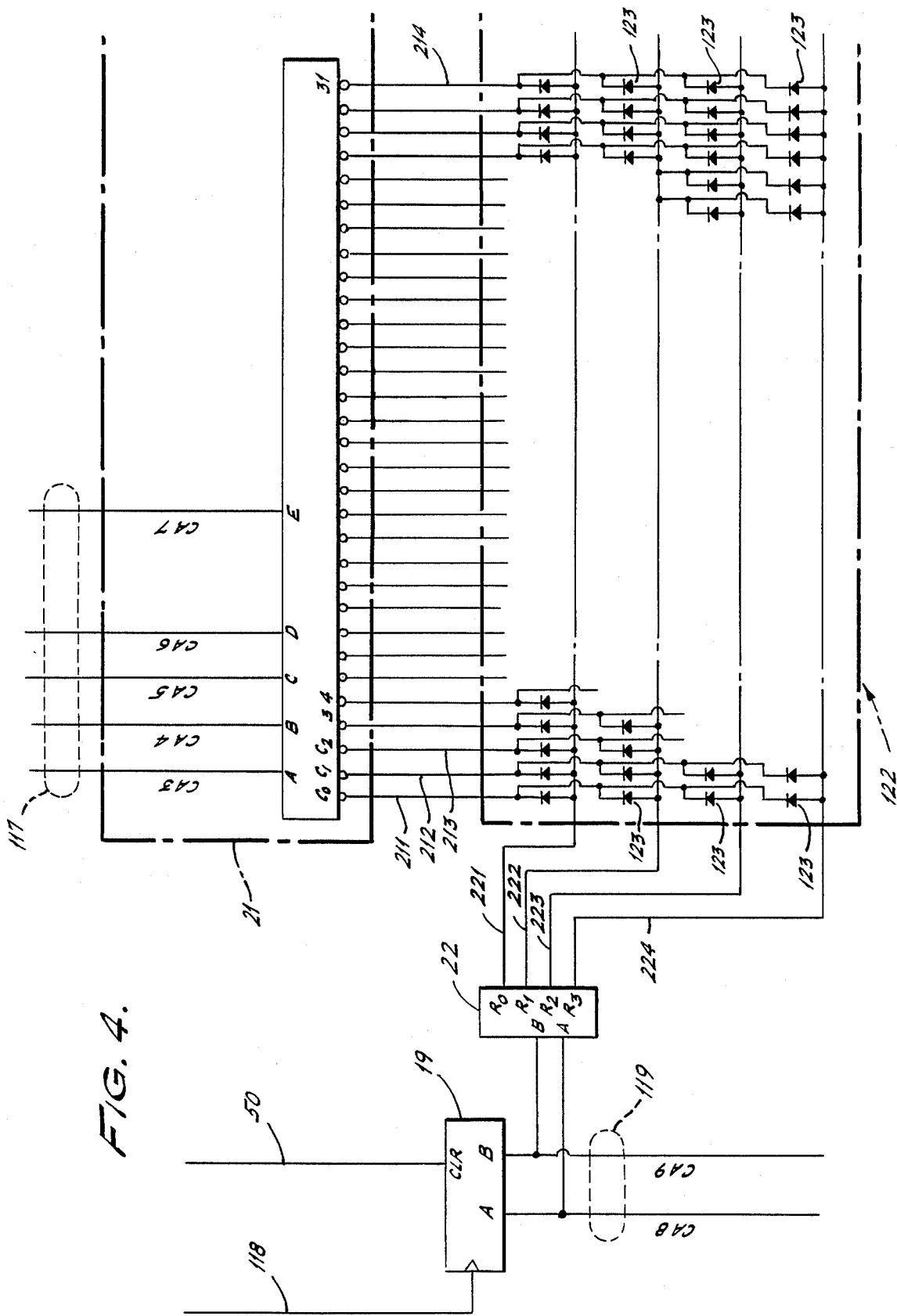
FIG. 4 is a fragmentary schematic diagram of the instant invention showing elements 19, 21 and 22 of FIG. 2.

As shown in FIGS. 2 and 3, signal 13 is input to two comparators, 16 and 15, and a voltage controlled oscillator 14. Commonly known symbols, such as clock symbols, enable symbols and output symbols Q and Q as are shown, are not explained in detail, it being apparent to one skilled in the art how such components work. Voltage controlled oscillator 14 is a commercially available component which responds to a voltage input by emitting a frequency of pulses that is proportional to the input voltage level. At the quiescent level, i.e. when the user is neither sipping or puffing on device 10, voltage controlled oscillator 14 emits no pulses. As the user applies vacuum to device 10, as voltage level 13 increases, pulses beging to be emitted from oscillator 14, and as voltage level 13 gets higher yet, these pulses increase in frequency.

The oscillator 14 emits a pulse train depicted by a signal 114. Signal 114 is the trigger input, as is known in the art, to a five bit binary counter 17 for changing columns on display 26. Five bits define 32 different variations. The output of counter 17, comprising five discrete signals, 117, is routed to three destinations: (1) a character generator 20, (2) a column decoder 21 which determines which column (of characters), such as $C_0$, $C_1$, $C_2$, ... , $C_{31}$, of 32 columns on display 26 (FIG. 1) is selected, and thereby allows the user to "select" different columns on display 26, and (3) a character code ROM 24.

When vacuum is applied to sensor 11 in excess of the vacuum needed to obtain maximum scanning speed, voltage level 13 reaches a pre-determined level set up at voltage comparator 15. Voltage comparator 15 therefore changes state, triggering a first monostable multivibrator 18. Monostable multivibrator 18 emits one pulse thereby incrementing a 2 bit binary counter 19 for changing rows on display 26.

As seen in FIG. 3, a pre-set reference voltage 58 is input to comparator 15 and when the strength of signal 13 crosses that reference voltage 58, comparator 15 changes state, thereby triggering monostable multivibrator 25. Multivibrator 25 emits a pulse 118 which increments row counter 19. The pre-set reference voltage 58 is determined such that when the user develops a vacuum in excess of that vacuum needed for the maximum scanning rate, as perceived on display 26, scanning will stop and comparator 15, by detecting more vacuum than is needed, sends a signal to row counter 19. Row counter 19 is a two-bit counter and can thereby describe four different situations (as will be explained below) which correspond to selecting different rows of characters on display 26. The output from counter 19 comprises two discrete signals 119 and provides input to a row binary decoder 22, which in turn energizes the appropriate row in an LED array 226 behind display 26 (as will be explained), to character generator 20 and to character code ROM 24.

When pressure is applied to sensor 11 generating a voltage 13 which crosses a pre-determined level of a reference voltage 55 (as seen in FIG. 3) set up at voltage comparator 16, the output of voltage comparator 16 changes state triggering a monostable multivibrator pair 25 comprising discrete multivibrators 33 and 34. The reference voltage 55 set up at comparator 16 is determined by the voltage divider comprised by resistors 52 and 53. The output pulse 125 emanating from multivibrator pair 25 accomplishes the transfer of data 138 (FIG. 2) from a character code ROM (read only memory) 24 to an external device such as 40 (as shown in phantom in FIG. 1). The pulse 125 emanating from multivibrator 17 also causes character generator 20 to cause character display 27 to flash in a "reverse display" mode (as will be explained) indicating to the user that a character transfer has been made.

As seen in FIG. 3, the pressure to voltage transducer 10 as may be commercially purchased and voltage to frequency transducer 45 as may be commercially purchased are schematically represented. As is known in the art, a transducer that accomplishes both of these transformations may, alternatively, be used. As an individual user starts to use the invention, three different adjustments may be made to allow easier or more convenient use. An offset potentiometer 41 is dialed to establish a quiescent, or neutral, voltage level of ground potential, as is known in the art. A second, or gain, potentiometer 43 is adjusted to accommodate pressures on device 10 without straining the user's mouth. Experimentation has shown that pressures of approximately six inches of water can be developed in the mouth without difficulty. Experimentation has also shown that vacuum of approximately 20 inches of water can be developed from the mouth without difficulty. In the invention, output voltage excursions of five volts per twenty inches of water provide necessary control. Therefore, reference voltage 58 is set to approximately four volts and reference voltage 55 is set to approximately $-0.5$ volts. Adjusting gain potentiometer 43 is necessary to allow the output signal from 10 to cross the reference voltages as the user sips and puffs on device 10.

A third, or frequency, potentiometer 45 is used to adjust pressure to scanning sensitivity by controlling the modulation sensitivity of voltage controlled oscillator 14. Depending on the handicap of the user, a transfer ratio in the range of four hertz per inch of water to 0.1 hertz per inch of water may be necessary.

Pulses that issue forth from voltage controlled oscillator 14 increment column counter 17. Column counter 17 output 117 provides the column select information to column decoder 21. Column counter output 117 in conjunction with row counter output 119 provides the data output select address to the output ROM 24. Column counter 117 in conjunction with row counter output 119 provides the secondary display character generator 20 with an offset address.

Row counter 19 is initialized to a binary weight of zero during power-up via signal 50. Row counter 19 is incremented when the analog signal 13 exceeds the voltage set up at comparator 15. The reference voltage 58 set up at comparator 15 is determined by the voltage divider comprised of resistors 56 and 57. When analog signal 13 exceeds the voltage at 58, the output 115 of comparator 15 changes state from low to high triggering monostable multivibrator 18. Monostable multivibrator 18 then issues forth a single pulse at 118 which increments row counter 19.

Row changing is accomplished when signal 115 changes in state from low to high. Signal 115 normally enables the column scanning, however, when a row change is being accomplished, the column scanning is disabled. Increasing vacuum applied at the sensor 11 increases the column scanning rate. When vacuum exceeds the column scanning range, row change is accomplished.

When pressure is applied to sensor 11 the voltage at 13 decreases. In the quiescent state, the voltage at 13 is at ground and the output 116 of comparator 16 is low. When sufficient pressure is applied to sensor 11 such that voltage level 13 drops below the level at 55, comparator 16 changes state causing signal 116 to change from low to high. The transition of signal 116 triggers monostable multivibrator 25.

The outputs of multivibrator 33 comprise a positive pulse output 133 and its inverse 132. (Signals 132 and 133 are represented in the block diagram of FIG. 2 as 125). Triggering multivibrator 33 accomplishes the transfer of data from the device. The clear input 50 to monostable multivibrator 33 is active during power up and assures that a spurious data entry operation does not occur during power up.

As seen in FIG. 3, monostable multivibrator 33 triggers on the positive edge of input 116 only when input 115 is low. Monostable multivibrator 33 also triggers on the negative side of input 115 only when the input 116 is high. In the quiescent state, signal 115 is low. When a character selection is made signal 116 goes high and monostable multivibrator 33 is triggered. Monostable multivibrator 33 issues forth a positive pulse at 133 and a negative pulse at 132. A fourth monostable multivibrator 34 is triggered by the trailing edge of the pulse on 132. Consequently, a positive pulse issues forth from multivibrator 34 on 115 which is applied to the output of multivibrator 33. If the signal on 116 is still high by the time of the trailing edge of the pulse on 115, multivibrator 33 will re-trigger and thereby accomplish another character transmission. Character transmission at periodic intervals will continue to occur as long as signal 116 remains high. The character repeat analogous to an electric typewriter's "typmatic" action of hold and repeat is thereby accomplished. If the signal at 116 is low by the time of the trailing edge of the pulse on 115 then repeated monostable multivibrator 33 is not retriggered and repeated transmission does not occur.

The codes for the standard ASCII set are stored in a "read only memory" (ROM) integrated circuit 24 (FIG. 6) as is known in the art. The output of ROM 24 provides the actual device output in two forms: (1) a parallel output and (2) a serial output. In the case of the parallel output, a data word from ROM 24 is buffered by buffer 37 and sent directly to an external device such as a computer, electronic typewriter or modem (as shown in phantom as 40 in FIG. 1). A pulse generated by monostable multivibrator pair 25 instructs the external device that the data word is valid. The serial output is comprised of a Universal Asynchronous Receiver Transmitter (UART) 30 such as may be obtained commercially in integrated circuit form. The character code output from ROM 24 is transferred to UART 30 upon the occurrence of a pulse from monostable multivibrator pair 25. UART 30 subseqently makes the character code output available to the external device in a serial format.

Figure 6:
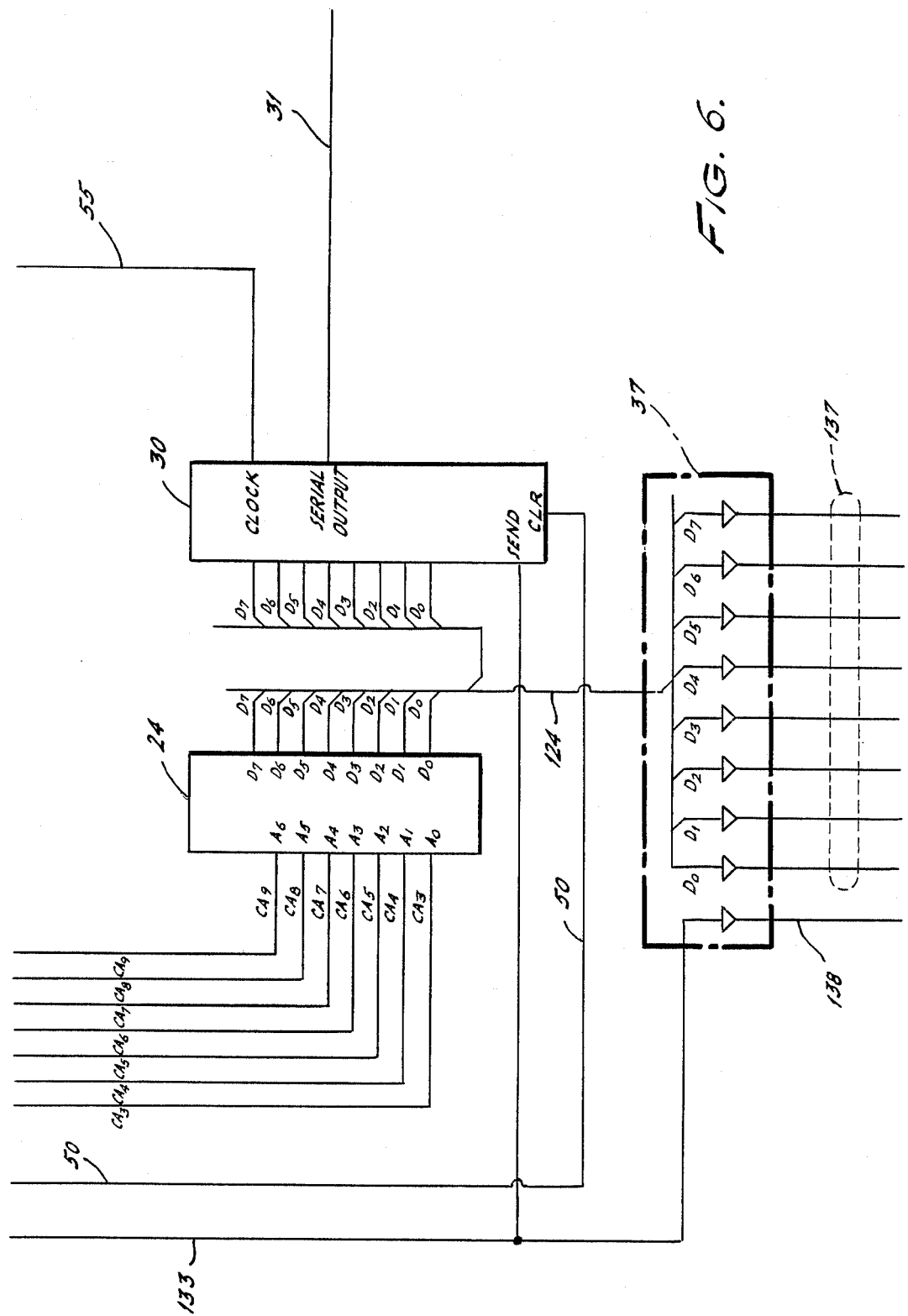
FIG. 6 is a fragmentary schematic diagram of the instant invention showing elements 24 and 30 of FIG. 2.

The operation of the code generating device involves selecting the appropriate address to be applied to ROM 24 and controlling the occurrence of the pulse emanating from monostable multivibrator pair 25. The address selected and applied to ROM 24 selects the desired character data word 124 to be transmitted via buffer 37. Pulse 138 accomplishes the transmittal. (FIGS. 2 and 6).

The address applied to the ROM 24 is generated by means of two counters, 19 and 17. These counters also provide the signals necessary to control the character generator 20 and an LED array 122 behind the character display.

Row and column counters 19, 17 provide control signals to LED array decoders 21 and 22 and character code ROM 24. Accordingly, character codes corresponding to the visual representation of the character counters are stored permanently in character code ROM 24 such that the data word present at the output of the ROM 24 represents the character on display 26 which is backlighted by the LED selected on array 122.

Figure 5:
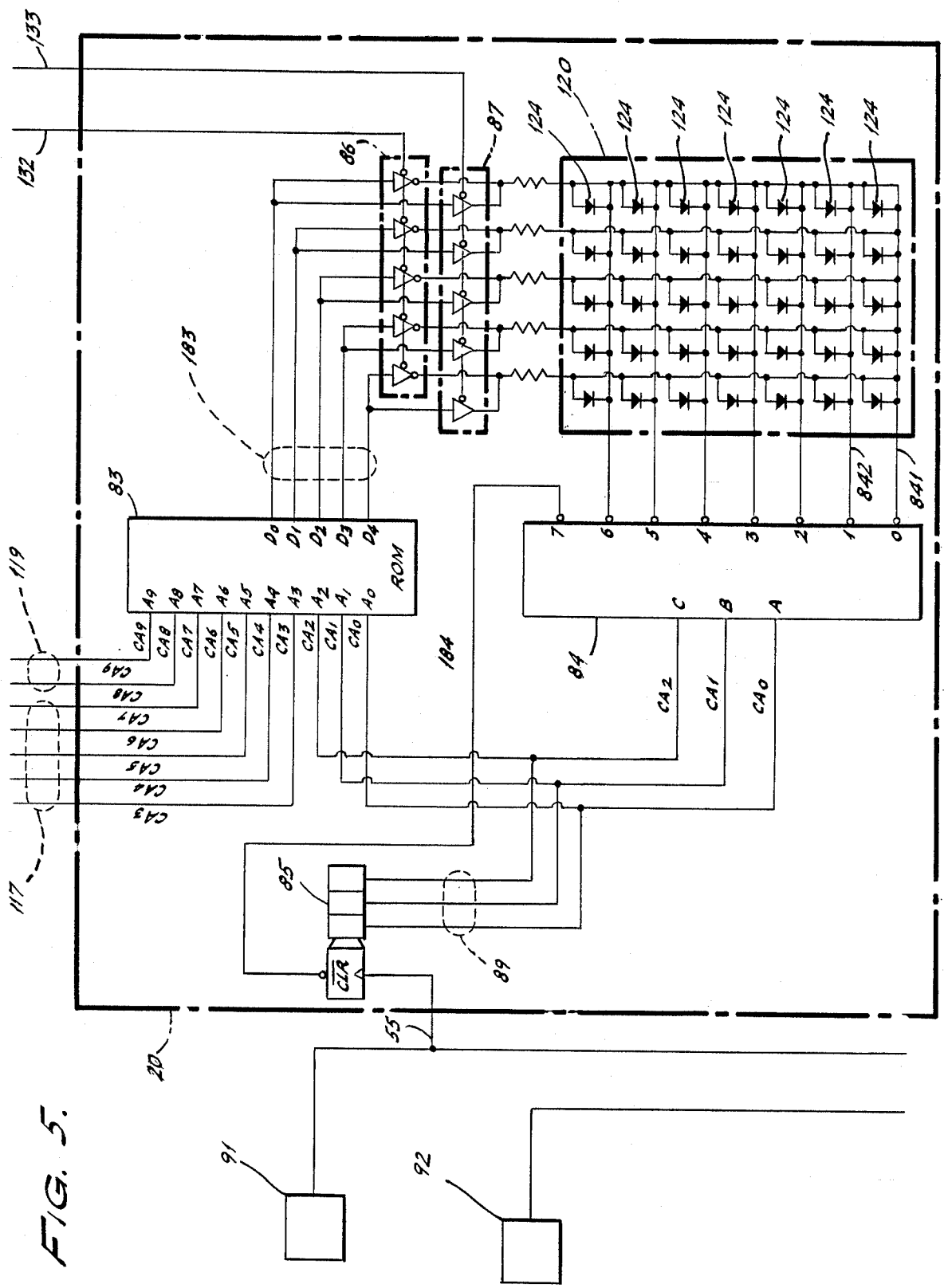
FIG. 5 is a fragmentary schematic diagram of the instant invention showing element 20 of FIG. 2.

As seen in FIGS. 2 and 5, row and column counters 19, 17 also provide an address for character generator 20. Character generator 20 controls a miniature array of lights 120 which the user perceives as 27 (see FIG. 1) at the top of display 26 such that the character on display 26 which is backlit by a light from LED array 122 is simultaneously displayed in a larger representation. The display 27 provides the user with a visual reinforcement which speeds the selection of characters in the scanning process.

The backlighting of display 26 is done by an LED array 122 which is comprised of a 4×32 matrix of identical light emitting diodes 123, each of which may backlight a character, such as 28, represented on display 26. Only one LED 123 is lighted at any instant in time. The row $R_0$, $R_1$, $R_2$, $R_3$, in which the lighted LED is selected is determined by counter 19 working in conjunction with a decoder 22 which supplies driving voltages on 221, 222, 223, and 224. If the binary weight of counter 19 is "0", a driving voltage is applied only to 221, the first row, $R_0$, of LED's. If the binary weight of counter 19 is "1", a driving voltage is applied only to 222, the second row, R₁, of LED's; and so forth as it may continue until the binary weight of counter 19 is "3", and a driving voltage is only applied to 224, the last row, R₃, of LED's.

An individual LED is lighted when the column decoder 21 provides a low impedance path to ground for the column of the sequentially selected LED. (Because only one row of the array is supplied with a driving voltage, and because only one column provides a circuit path to ground, only one LED is lighted at any instant in time). Column decoder 21 is controlled by five bit counter 17. When the binary weight of counter 17 is "0", only the first column 211 of the array 126 is driven to ground. When the binary weight of counter 17 is "1" only the second column 212 of array 126 is driven to ground. When the binary weight of counter 17 is "2" only the third column 213 of array 126 is driven to ground and so forth as it may continue until the binary weight of counter 17 is 31 and the 32'nd column 214 of array 126 is driven to ground.

As an example, if row counter 19 contained a binary weight of "0" and the column counter 17 contained the binary weight of "0", the first character in the first row of the front panel display 26 would be backlighted by the first LED in the first row of the LED array 122. As column counter 17 is allowed to increment, the LED's in the first row are sequentially lighted. After the 32'nd LED in the first row is lighted (the last LED on the row), the column counter rolls over to a count of "0". Character "scanning" is thereby accomplished along the top row of array 122.

If row counter 19 contains a binary weight of "1" scanning occurs along the second row of array 122. If row counter 19 contains a binary weight of "2" scanning occurs along the third row of array 126. If the row counter 19 contains a binary weight of "3" scanning occurs along the fourth row of array 122.

A miniature display 27 (FIG. 2) located at the top of display 26 is comprised of a 5×7 array of identical LED's. During normal scanning operation, tri-state buffer 87 (as seen in FIG. 5) provides the driving voltage to light the LED's of array 120. The individual LED of array 120 is lighted when a driving voltage is applied to the anode of an LED 124 and a circuit path is completed to ground via decoder 84. Consequently, only one row of LED's 120 is lighted at any instant in time. Character generation is accomplished by sequentially lighting each row at sufficient speed such that to the observing eye all rows appear to be lighted at once.

Character generator 20 includes a character ROM 83 which contains the pre-selected code necessary to light each LED in miniature display 120 at the appropriate instant in time. This information is addressed by means of three counters: (1) row counter 19; (2) column counter 17; and (3) the display counter 85. The miniature display counter 85 is continuously incremented at a rate exceeding 1 KHz by means of the system clock 91. The row and column counters 19, 17 provide a pointing address to the character ROM 83. Each pointing address is unique to the character being displayed. The output of miniature display counter 85 provides the lower address for character ROM 83 and also controls the row decoder 84. The data output of ROM 83 determines which columns of the LED array 120 obtain a driving voltage. Since the counter output simultaneously addresses b oth ROM 83 and decoder 84, the desired pattern of lighted LED's for a row may be stored in an individual memory location, as is known in the art. As counter 85 increments, a new data word is applied to driver 87. Simultaneously, a new row is selected by decoder 84. Counting proceeds from a binary weight of "0" (which selects the pattern for the lower row of display 120) to a binary weight of "6" (which selects the pattern for the upper row of display 18). On the count of weight "7", counter 85 is reset via the signal 184. Subsequently, counter 85 continues to count and the character image is again reproduced on display 120.

Tri-state buffers 87 and 86 (FIG. 5) are controlled by signals 133 and 132 from monostable multivibrator 33. These buffers are configured in such a manner that when buffer 87 is enabled, buffer 86 is disabled. Data in ROM 83 is arranged such that the character representation of display 120 presents the lighted form of the character against a dark background. When a character selection is made, monostable multivibrator 33 reverses the polarity of both signals 133 and 132. Consequently, buffer 87 is disabled and inverting buffer 86 is enabled. Since the signals issuing forth from ROM 83 are inverted, the character is represented as a dark form against the background of lighted LED's. The duration of the reversal of signals is governed by multivibrator 33. The duration is visually perceptable by the user and serves as an indication that a character has been selected and transmitted to an external device 40 (as seen in phantom in FIG. 1).

As mentioned, row and column counters 19, 17 have unique values which correspond to unique characters. The "E" which is indicated at 27 on FIG. 1 (as an example) comprises the selection of positions R₁ and C₇. The combination of signals from counters 19, 17 provides a pointing address, that is, the higher address bits to ROM 83. The lower address bits are provided by counter 85 and bus 89 represents the output of this counter. Bus 89 is depicted as the lower address bits to ROM 83. Counter 85 operates at relatively high speed and also provides an input to decoder 84. Character generator 20 works by lighting the desired lights on display 120 whereupon only one row is lit at any one time. The rows are lit in such rapid succession that it appears to the visual observer that all rows are lit simultaneously. The pattern of lights for each row is provided by the data words previously stored in ROM 83. For example, (as seen in FIG. 5) if the count on bus 89 is zero, the pattern of lights, or the pattern for the first row 841 is illuminated. The specific information for this row is provided by the output of ROM 83. As the high speed counter 85 increments, for example, if it increments by 1, the second row 842 of decoder 84 is enabled and the next data word from the base address provided by 14 and 15 is output by the ROM on bus 183. Consequently, the light pattern on the second row 842 is effected on the display, and so on so that the third row, fourth row, fifth row, in seriatum, are enabled in succession and different words corresponding to the desired pattern are output by ROM 83. The process is done in such rapid succession that all rows appear to the visual observer to be illuminated with the desired pattern at once.

The driving voltages for the character display 120 are provided by buffers 86 and 87. The normal representation of the character is in the positive form, where, for example, the lights which represent the "E" are lit. When the character is transmitted to an external device, it is desirable to give the user an indication, either audible or visual, that the character has been transmitted. In the preferred embodiment, the character is momentarily shown in a reverse representation, thereby indicating to the user that the character has been transmitted. The reverse representation of the characters means that, for example, all lights that delimit the "E" are momentarily extinguished and all other lights are momentarily illuminated, thereby giving the negative or the reverse representation of the "E". This is accomplished by controlling the two buffers 86 and 87. The actual circuit implementation enables only one buffer at any instant in time. When buffer 86 is enabled, buffer 87 is disabled. When buffer 87 is enabled, buffer 86 is disabled. Both buffers 86 and 87 are connected to the same data output word 183. Consequently, when the signal lines 86 and 87 are reversed, the reverse representation of the word 183 is implemented or effected on the display 120, and thereby produces the reverse representation of the character. The reversal of 86 and 87 is momentarily accomplished when character transmittal is effected by the user.

Only six discrete decoded signals are necessary to enable the six rows of miniature LED array 120. Consequently, superfluous counts from the counter 85 are unnecessary. Counter 85 is reset to a count of zero as the seventh count is attained. When counter 85 is reset, the output of decoder 84 immediately reverts to illuminating the first row 841 of the miniature display 120. The action of resetting the counter after the sixth count simply enables a more efficient allocation of space in ROM 83.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

What I claim is:

1. An improved method of selecting an element of a group comprising steps of:
    (a) serially scanning the elements of the group at a rate which is proportional to a user controlled continuously variable volitional signal;
    (b) stopping said serial scanning step under an ambient condition.
    (c) selecting the said element of the group by changing the user controlled volitional signal in a direction or magnitude different from that which is applied under scanning step (a).

2. The method of claim 1, wherein an ambient condition forming step (b) adjusts the scanning step to a speed sufficiently slow to accommodate character selection.

3. The method of claim 1, wherein the said user controlled continuously variable voltional signal comprises air vacuum which may be generated in the mouth of the user.

4. The method of claim 3, wherein the change of said volitional signal (b) comprises air pressure which may be generated in the users mouth.

5. The method of claim 1, wherein the said user controlled continuously variable volitional signal comprises air pressure which may be generated in the mouth of the user.

6. The method of claim 5, wherein the change of said volitional signal (c) comprises air vacuum which may be generated in the user's mouth.

7. The method of claim 1, wherein the selection of the said element in step (c) is accomplished by means of a switch closure.

8. The method of claim 1, wherein the user controlled continuously variable signal (a) may include discontinuities such as step responses.

9. The method of claim 1, wherein a different group of elements to be scanned is selected when the magnitude of the said user controlled continuously variable volitional signal crosses a pre-selected threshold limit.

10. The method of claim 1, wherein a different group of elements to be scanned is selected by means of a switch closure.

11. The method of claim 1, wherein the selection of a said specific element according to step (c) is repeated if conditions comprising step (c) remain unaltered after an elapsed time duration.

12. A communication method, for use by handicapped individuals for selecting an element of any array, comprising steps of:
    (a) serially scanning the elements of the group at a rate which is proportional to a user controlled continuously variable volitional signal;
    (b) stopping said serial scanning step under an ambient condition.
    (c) selecting the said element of the group by changing the user controlled volitional signal in a direction or magnitude different from that which is required for said scanning step (a).

13. The method of claim 12 further comprising the step of selecting from a multiplicity of groups of elements to be scanned.

14. The method of claim 12 further comprising a dual display such that a first display visually represents the array elements to be scanned and a second display visually represents a character which is instantaneously being scanned.

15. The method of claim 12 further comprising a means of feedback to the user indicating that a character has been selected.

16. An apparatus for aiding handicapped persons in selecting an element of an array, comprising:
    means for sequentially generating coded signals corresponding to the array elements;
    means for serially scanning the elements of a group at a rate which is proportional to a user controlled continuously variable volitional signal;
    means for selecting said element of an array upon signal threshold limits, switch closeure, or the combination of a multiplicity of applied control sources.

17. The apparatus of claim 16, wherein ambient condition adjusts the scanning to a speed sufficiently slow to accommodate character selection.

18. An apparatus for aiding handicapped persons in selecting an element of an array of claim 16 further comprising two displays:
    a first display showing the elements of the group to be scanned;
    a second display showing the element of the array which is instantaneously being scanned.

19. The apparatus of claim 16 further comprising a means of feedback to the user indicating that a character has been selected.

20. The apparatus of claim 16, wherein an ambient condition stops the scanning.

* * * * *